UNITED STATES PATENT OFFICE.

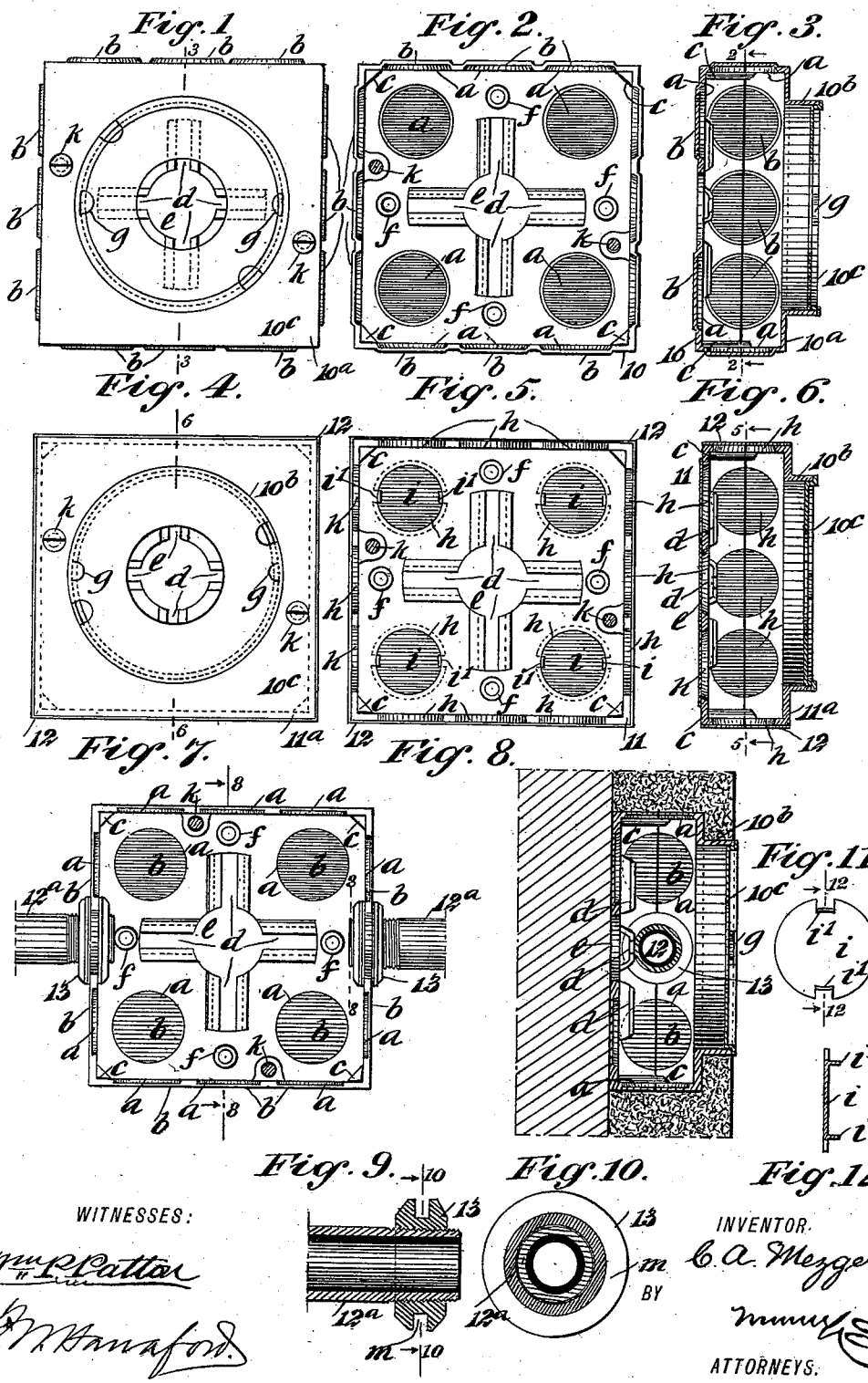

CHARLES A. MEZGER, OF BROOKLYN, NEW YORK.

CONDUIT OUTLET-BOX FOR ELECTRIC WIRES.

SPECIFICATION forming part of Letters Patent No. 564,527, dated July 21, 1896.

Application filed January 25, 1896. Serial No. 576,816. (No model.)

*To all whom it may concern:*

Be it known that I, CHARLES A. MEZGER, of Brooklyn, in the county of Kings and State of New York, have invented a new and Improved Conduit Outlet-Box for Electric Wires, of which the following is a full, clear, and exact description.

My invention relates to outlet or junction boxes for conduits that contain electric wires used in the distribution of electricity for lighting buildings and other purposes. In modern practice, for the distribution of electricity used in incandescent or arc lighting of interiors of buildings, as well as for other purposes, it is customary to incase the insulated wires which extend from a source of electricity throughout the rooms of the building in tubular metal conduits which are lined with insulating material, and at suitable points in the walls or floor of each room an outlet cavity in the form of a box having a cover is provided to facilitate the outward extension of the wires from the conduits that are merged at the ends of the same in the walls of a junction or outlet box.

There may be one conduit for electric wires extended to an outlet-box in a room, or several conduits be projected thereto, and may enter the bottom wall or one or more side walls of said box at an arbitrary point, as the trend of the conduit-pipes for wires is sometimes controlled by the plan of construction had in walls of the building, so that the terminals of the conduits at the outlet-boxes vary in relative position, comparing one box with another.

It is very essential in the wiring of a building for electric lighting or other electric service that such work be completed before the walls are coated with plaster, as the difficulty of introducing outlet-boxes for fixtures, switches, or other necessary adjuncts to the lighting or signaling equipment is greatly enhanced if such work is delayed until the walls and ceilings of rooms are coated with plastering in the usual way.

Owing to the variation in position of inlet-apertures in the junction or outlet boxes, as before explained, it has heretofore been the custom to place all the conduits for electric wires before the walls are plastered, and then make a diagram indicating the relative positions of terminals of the conduits that have to be introduced in one or more walls of each outlet-box. After the necessary data has thus been obtained, the usual way is to order these special boxes from the manufacturer and await their construction and delivery to the contractor doing the house-wiring.

Frequently delays occur in furnishing the special outlet-boxes, and the plasterer proceeds with his work, so that the party doing the house-wiring must cut out cavities in the finished walls to permit of the introduction of the outlet-boxes, whereby in some cases injury to the walls unavoidably results, while the work of placing said boxes is greatly retarded, on account of the wall-cutting that must be done to introduce the boxes at proper points in the walls and ceilings of the rooms.

The object of my invention is to provide a peculiar and novel construction for the outlet-boxes that receive and support the ends of electric-wire conduits used in wiring buildings, which will afford convenient and reliable means for the introduction of the ends of said conduits in a wall or walls of each box without delay, or the necessity of providing a special individual box for each location, whereby the boxes can be ordered in any required number previous to the commencement of the work of wiring a building, and the entire wiring and the outlet or junction boxes and other adjuncts that connect with said boxes may be placed in position before the plastering of the building is commenced.

A further object is to provide a novel construction for the outlet-boxes which will facilitate their introduction and the connection of the house-wire conduits therewith when said boxes have to be placed in suitable excavations formed to receive them in plastered or other finished walls of a building after the latter has been erected and completed prior to the introduction of electricity for lighting or other purposes.

To the indicated ends my invention consists in the novel construction and combination of parts, as is hereinafter described, and defined in the claims.

Reference is to be had to the accompanying drawings, forming a part of this specification, in which similar characters of reference indicate corresponding parts in all the figures.

Figure 1 is a plan view of the improvement in one of its forms of construction. Fig. 2 is a plan view of a lower section of the improved outlet-box shown in Fig. 1 on the line of separation for both sections of said box. (Indicated at 2 2 in Fig. 3.) Fig. 3 is a transverse sectional view substantially on the line 3 3 in Fig. 1. Fig. 4 is a plan view of a slightly different construction of the improved outlet-box. Fig. 5 is a plan view of the lower section of the box represented in Fig. 4, taken essentially on the line 5 5 in Fig. 6. Fig. 6 is a transverse sectional view on the line 6 6 in Fig. 4. Fig. 7 is a plan view of the lower half-section of the box, showing another slight modification in construction and the ends of wire-supporting conduits connected therewith. Fig. 8 is a transverse sectional view of the outlet-box embedded in position in the side wall of a room, the line of section being indicated at 8 8 in Fig. 7. Fig. 9 is an enlarged longitudinal sectional view of one end portion of a house-conduit for electric wires and a circumferentially-grooved nut thereon, affording novel means for connecting the tubular conduit at its end with an apertured side wall of the outlet-box. Fig. 10 is a transverse sectional view on the line 10 10 in Fig. 9. Fig. 11 is an enlarged detached view of a stopper-plate for apertures in one style of the outlet-box, as indicated in connection therewith in Fig. 5, and Fig. 12 is a transverse sectional view of the stopper-plate on the line 12 12 in Fig. 11.

There are several novel features of construction embodied in my improved outlet-box, consisting, first, in the formation of the box in two main parts or sections that are joined together edgewise on a transverse plane. The section of the box that is outermost in use is adapted to receive a cover and retain the latter removably in place. The second feature of primary importance comprises the provision of a plurality of partly or wholly completed openings in the sides and bottom wall of the two-part box, the said partial or complete openings being semicircular in outline in each side wall of a box-section, these semicircular formations being opposite in pairs when the two main sections of the box are joined, so that the joining together of the two parts of the box will afford a plurality of circular-edged incipient or complete orifices in each side wall of the box.

Another essential feature of the invention consists in the provision of guiding projections at suitable points on one section of the box which will slide into the other section when both sections are in contact at their meeting edges, whereby these joined sections of the outlet-box are held from lateral displacement.

Another novel feature of the improved outlet-box consists in the formation of radial slots in the bottom wall of what may be termed the "lower-half section" of the box, which slots extend from a central opening therein and are adapted to receive a headed screw or bolt for the secured connection of fixtures to the bottom wall of the box, which may be introduced through an opening in the lid of the upper box-section. The said slots are also available for the introduction of screws through two or more of them into a stable portion of the building-wall or floor of the same to secure the box in position.

Another important novel feature of the improvement consists in the peculiar formation of a coupling-nut for each house-wire conduit, which nut is interchangeable to permit conduits of different diameters to have a coupled engagement effected between a threaded end of the same and a complete aperture in the side wall of two joined box-sections, the nut by its construction being adapted for ready insertion or removal.

Referring to the drawings, it will be seen that the outlet-boxes shown are all rectangular in contour, and it here may be stated that while a box having a rectangular form is preferable it is not imperative that the improved outlet-boxes be so shaped in outline.

As indicated in the brief description of the several figures of the drawings, slight modifications in construction of the two-part outlet-box are shown, all based on the broad feature of invention comprising the provision of incipient or complete apertures in sufficient number in the sides and bottom of a box to permit one or more end portions of wire-holding conduits to be held in engagement with the box without regard to the point of approach to said box had by the conduit or conduits. These slightly different styles of construction will now be described.

In Figs. 1 to 3, inclusive, are shown incipient orifices defined in the sides and bottom wall of the two-part outlet-box, said orifices being each partly produced by an indentation of semicircular form on the inner side wall of the box, three such half-circular indentations $a$ being formed in each side wall of a section, which will afford a complete circular formation when the meeting edges of the two box-sections 10 10$^a$ are in contact, as shown in Fig. 3. It will be observed in this form of construction that the semicircular indentations $a$ are of a depth almost equal to the thickness of the side walls they are produced in, and said indentations are covered by integral thin plates $b$, which join the peripheral edges of the indentations, whereby the outer surfaces of the side walls of the outlet-box are rendered imperforate. Should it be desired to produce a circular-edged orifice at a point coinciding with any of the incipient apertures or indentations $a$, the thin-plate covering $b$ is broken, so as to remove each semicircular portion of the same, which can be readily effected with a convenient implement used by the workman who is placing the boxes in position, so that an appropriate aperture may thus be produced with ease and celerity as occasion may require, and it will be manifest that such portions of the box as are not completely apertured in the manner specified will remain intact and thus prevent the entrance of mortar or other detrimental material within the box when the latter is in position. At each corner of the lower box-section 10 a guide-post $c$ is projected a short distance above the free edge of said portion of the outlet-box, and these posts are adapted to fit in the corners of the upper box-section $10^a$ when the two sections are fitted together, as shown in Fig. 3, and it will be evident that the provision of the short posts $c$ will retain the respective sides of the joined box-sections in alinement and effectively prevent lateral displacement of the same in any direction. There are four radial slots $d$ formed in the bottom of the box-section 10, which at their inner ends intersect the edge of a central circular aperture $e$ formed in the bottom of said box-section, and the lower wall of the bottom is recessed along the edges of each slot for reception of bolt or screw heads. The slots $d$ afford means for the convenient bolted attachment of any desired fixture which is to project from the outlet-box, and also may be utilized for the insertion of the bodies of screws through said slots into timbers or other stable portions of the building, walls, or floors to retain the box-section 10 in position. Other screw-holes $f$ may be provided in the bottom wall of the box-section 10 for the reception of screws if such additional screw-holes are desired.

The upper box-section $10^a$ is preferably furnished with a circular flanged projection $10^b$, having two ears $g$ projected inwardly from the outer edge of said flange, and a lid $10^c$ is fitted on the circular portion of the box, projecting into it a sufficient degree to permit the ears $g$ to lock the lid in place after the ears have passed through notches in the lid and the latter is rotatably moved. The lid $10^c$ may be imperforate if the box is placed in the floor, and when the box is located in the wall or ceiling of a room the lid may be suitably apertured for admission of a fixture of any style that is to be held projected from the wall or ceiling.

In the bottom of the section 10 circular indentations $a$ are formed, which are covered by thin integral plates $b$, and any of the said circular recesses may readily be converted into a complete orifice by removal of the covering $b$ with a convenient implement, so that a conduit for wires may be entered by its end in an appropriate aperture in the bottom of the outlet-box, which has been readily produced, as required, by the workman who is wiring the building.

In Figs. 4, 5, and 6 a rectangular two-part outlet-box is shown which is substantially similar in construction to the one already described, the only difference consisting in the formation of complete orifices $h$ in the sides and bottom of the box-sections 11 $11^a$ and the covering of said orifices with a thin envelop 12 for the semicircular or half orifices in each section 11 $11^a$ of the box. As shown, the application of the envelops 12 seals the orifices on the outer sides of the box, and as the said encircling closures are formed of material that may be easily cut there may be an orifice completed at a suitable point in either side wall of the box by use of a tool that will quickly remove the portion of the envelop from over an appropriate orifice. The circular openings $h$ in the bottom wall of the box-section 11 are completed in this style of construction for the outlet-box, and detachable cover-plates $i$ are provided, the preferred form of which is clearly shown in Figs. 11 and 12, and it will be seen that these coverings each consist of a disk having ears $i'$ formed near its edge, which are adapted to bear on the peripheral edge of the orifice in the bottom of the box-section 11 and hold the cover over said orifice, to be readily removed as occasion may require. In Figs. 7 and 8 another slightly-modified method in the production of detachably-covered orifices in the outlet-box is shown. In this construction there are indentations $a$ formed in the sides and bottom wall of the two-part box in the same manner as represented in Figs. 1, 2, and 3, the cover-plates $b$ in this case being formed integral but flush with the outer sides of the box, the said thin coverings being in a like manner removable when a complete orifice is to be produced in a side wall or bottom of the box.

The two sections of the improved outlet-box are held secured together by two screws $k$, that pass through perforations in the top section of the box and screw into threaded perforations in the bottom of the lower section, the said screws having heads that contact with the top wall of the upper section and thus adapt the screws to draw both sections of the box together. The interior of the improved outlet-box is rendered non-conductive of electricity, preferably by coating it with enamel, but other means may be employed for said purpose.

The improved means for detachably securing an end of a conduit $12^a$ in the side of the two-part outlet-box consists in providing a nut 13, having a circumferential groove $m$ formed in it. The body of the nut where grooved is circular and is of such a diameter externally as will permit it to fit in any completed orifice in the side wall of the two-part box, and it will be seen that as the receiving-orifice is formed half in each box-section the nut 13, after it is screwed on the end of the conduit, may be readily slid into place in the lower box-section, and that the upper box-section may then be placed in position, thereby clamping the nut and retaining the end of the conduit connected with the outlet-box, as clearly indicated in Figs. 7 and 8.

My improvements in outlet-boxes for electric wiring will not only expedite the work in new buildings, but will also facilitate the introduction of such outlets in structures where the walls have been plastered, as the sectional division of the improved box and novel means for connecting the ends of the wire-holding conduits enables the ready introduction of the boxes in suitable recesses cut to receive them in the plastered walls at proper points, and also permits the easy and reliable connection of the ends of the conduits to be effected with the sides or bottoms of the boxes.

Having thus described my invention, I claim as new and desire to secure by Letters Patent—

1. An outlet-box for electric wires, the box having a series of weakened portions capable of being broken to form openings, the weakened portions serving to regulate the form of the break, substantially as described.

2. An outlet-box for electric wires, the box consisting of two sections, each having an opening therein, the openings matching to form a single opening when the sections are joined, a pipe passing through the said single opening, and a nut screwed on the pipe, the nut having an annular groove receiving the edges of the said single opening, substantially as described.

3. An outlet-box for electric wires, the outlet-box having two sections, each of which is formed with a weakened portion, said weakened portions matching with each other when the sections are joined and the weakened portions being capable of being broken to form a single orifice, the form of which is regulated by the form of the weakened portions, substantially as described.

4. An outlet-box for electric wires, consisting of two sections, one of which is formed with two crossing slots and the remaining section being formed with a circular opening from which a flange outwardly projects, the flange having an inwardly-extending ear, and a circular cover for the opening, the cover engaging the flange and having an opening receiving the ear of the flange, the box having openings therein through which the wires may pass, substantially as described.

5. An outlet-box for electric wires, the box being formed of material part of which has less strength than the remaining part, the thus weakened part being capable of being broken separately from the remaining part and the weakened portion serving to regulate the form of the break, substantially as described.

CHARLES A. MEZGER.

Witnesses:
WM. P. PATTON,
A. A. HOPKINS.